United States Patent [19]
Natalizia

[11] Patent Number: 5,794,661
[45] Date of Patent: Aug. 18, 1998

[54] TANK ISOLATION VALVE

[75] Inventor: Mark L. Natalizia, Willits, Calif.

[73] Assignee: Microphor, Inc., Willits, Calif.

[21] Appl. No.: 734,165

[22] Filed: Oct. 21, 1996

[51] Int. Cl.$^6$ ............................................ F16K 15/14
[52] U.S. Cl. .................... 137/849; 137/515; 137/859; 137/845
[58] Field of Search ...................... 137/849, 859, 137/845, 844, 846, 515

[56] References Cited

U.S. PATENT DOCUMENTS

| | | | |
|---|---|---|---|
| 2,023,267 | 12/1935 | Rapt | 137/849 |
| 2,092,757 | 9/1937 | Groeniger | 137/849 |
| 3,047,013 | 7/1962 | Baumbach | |
| 3,401,867 | 9/1968 | Long | 137/845 |
| 3,528,342 | 9/1970 | Simcock | 137/859 |
| 3,707,986 | 1/1973 | Breen | |
| 3,811,466 | 5/1974 | Ohringer | 137/845 |
| 4,003,398 | 1/1977 | Duveau | 137/845 |
| 4,646,781 | 3/1987 | McIntyre | 137/859 |
| 4,762,308 | 8/1988 | Geno | 137/849 |
| 4,869,431 | 9/1989 | Jubert | 137/845 |
| 4,922,947 | 5/1990 | Champsiex | 137/859 |
| 5,041,095 | 8/1991 | Littrell | |
| 5,322,094 | 6/1994 | Janesko | 137/845 |

*Primary Examiner*—Denise L. Ferensic
*Assistant Examiner*—Ramyar Farid

*Attorney, Agent, or Firm*—Knobbe, Martens, Olson & Bear, LLP

[57] ABSTRACT

A tank isolation valve assembly for use in an effluent discharge path to provide a vapor barrier to prevent back flow of gases while enabling fluid and solid substances to pass through in a desired flow direction. The assembly includes a main housing having an apertured outlet wall structure with an internal surface defining a valve receiving region, a second member coupled to the main housing and having an apertured wall structure with a valve member retaining surface facing the valve receiving region, and an isolation valve member. In one embodiment, the second member is a mating inlet housing with an inlet for connection to an effluent discharge port, and the main housing has an outlet port and a valve chamber. In another embodiment, the second member is a valve plate with a dished peripheral portion in sealed contact with a portion of the inner surface of the main housing. The isolation valve member is a flexible diaphragm mounted in the valve chamber in sealing relation therewith. The flexible diaphragm comprises a pair of disks each having a plurality of through slits extending from the center toward the periphery. The two disks are arranged with the through slits in non-overlapping relation so that solid portions of each disk overlie the slits of the other. The isolation valve member is preloaded in the assembly by means of a complementary pair of angled mounting surfaces formed on the internal surface of the main housing and the valve member retaining surface. A plurality of mounting bosses formed in the main housing extend through boss receiving apertures in the diaphragm and the second member and fix the diaphragm in position.

5 Claims, 5 Drawing Sheets

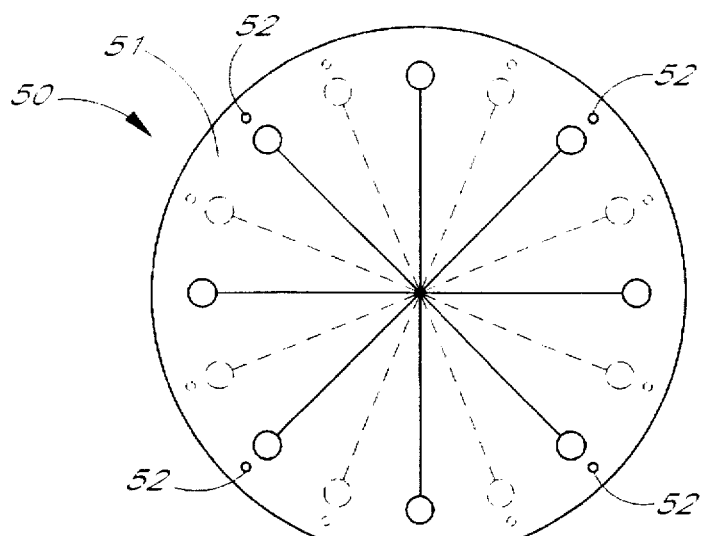
FIG. 5
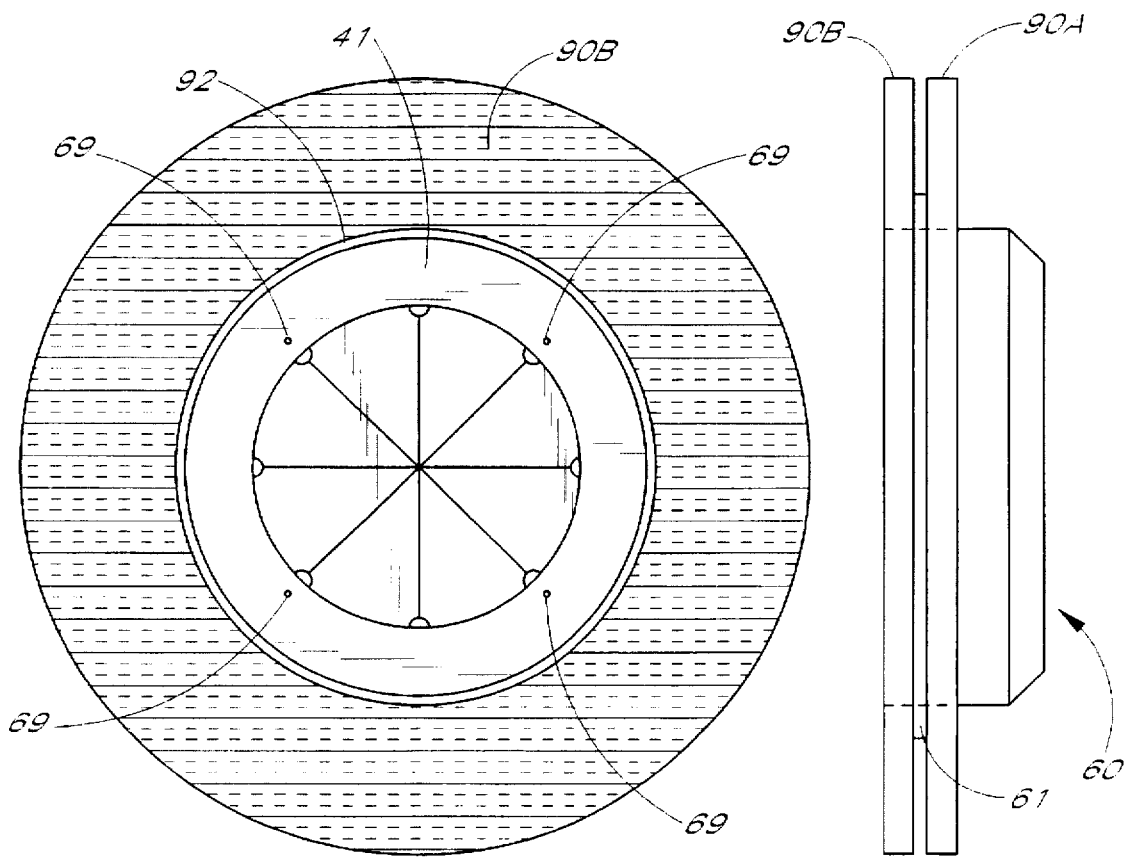
FIG. 9
FIG. 8

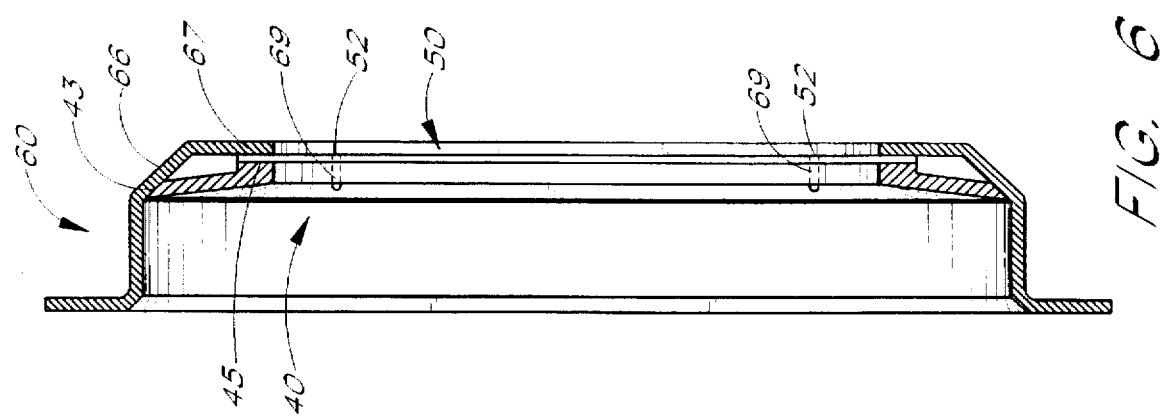
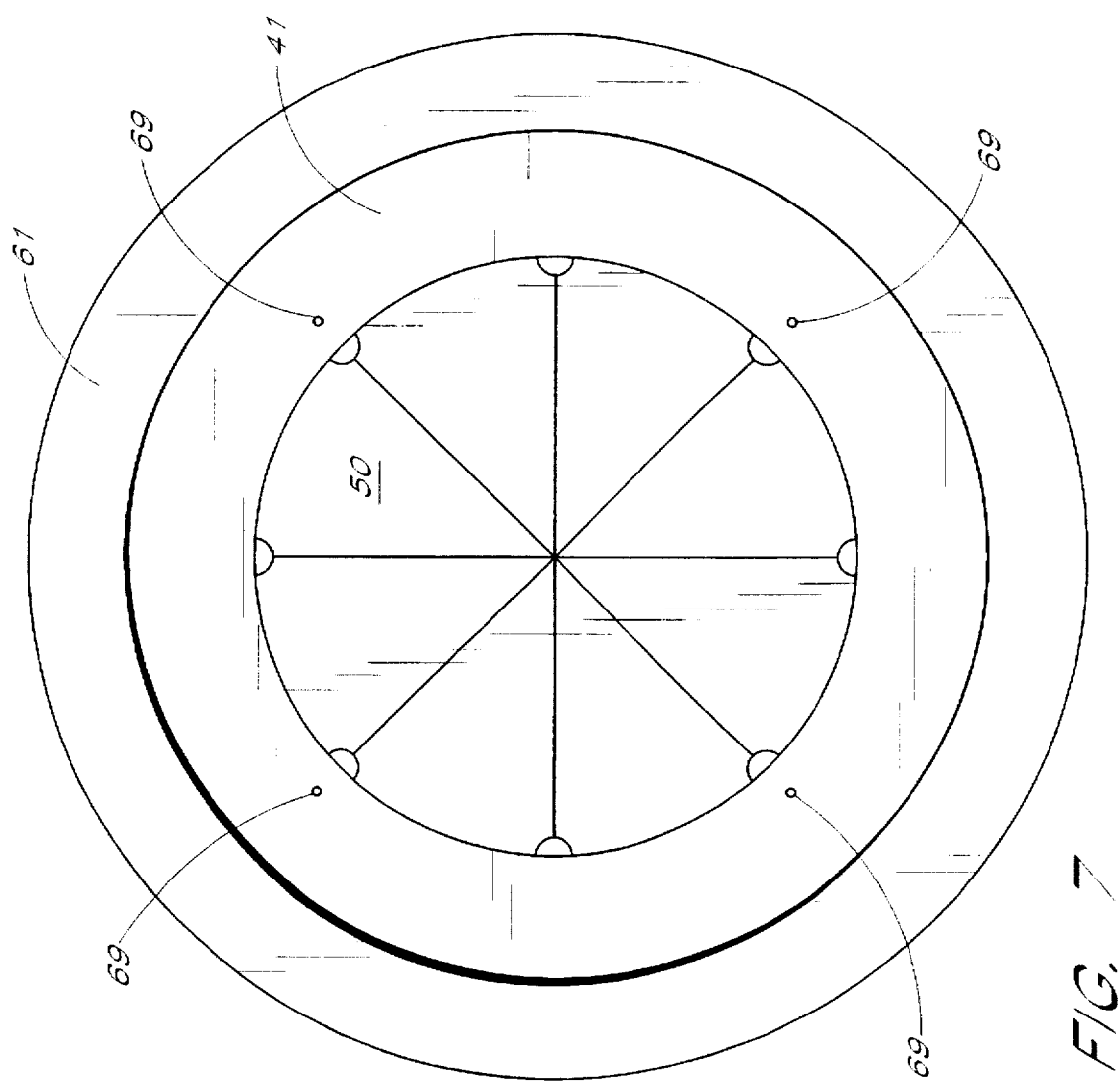

TANK ISOLATION VALVE

BACKGROUND OF THE INVENTION

This invention relates to isolation valves used to provide a vapor barrier for effluent discharge systems.

Tank isolation valves are known which are used to provide a vapor barrier in waste discharge applications, such as toilet room facilities. Such valves are typically installed in a location in the effluent discharge flow path, such as immediately downstream of the trap in a common toilet, and are intended to prevent a malodorous discharge of back pressure waste tank gases through the toilet assembly. Such valves can be used in a wide variety of installations, such as residential, commercial, transportation (both public and private), recreational vehicles, public restroom facilities and marine installations. Representative examples of such valves are found in U.S. Pat. Nos. 3,047,013 and 3,707,986, the disclosures of which are hereby incorporated by reference.

In order to function well, a tank isolation valve must not only eliminate the flow of annoying and unpleasant fumes in the backward direction of the normal effluent flow path, but must also possess other functional characteristics. For example, a tank isolation valve should be of ruggedized design in order to pass various severe test conditions, but must also provide easy installation, access and serviceability. Further, a tank isolation valve must provide the vapor barrier isolation while at the same time imposing no restriction on the ability of the effluent discharge mechanism (e.g. a toilet) from passing a wide variety of solid substances (paper products, rubber gloves, plastic debris, metal fasteners and the like). Efforts to date to provide a tank isolation valve possessing all of these characteristics have not met with success.

SUMMARY OF THE INVENTION

The invention comprises a tank isolation valve which provides an effective vapor barrier isolation in an effluent discharge system, while also having a ruggedized design, ease of installation, access and serviceability, and which functions without restricting the ability of the effluent discharge mechanism to pass a wide variety of liquid and solid substances.

From an assembly standpoint, the invention comprises a tank isolation valve assembly for use in an effluent discharge path to provide a vapor barrier to prevent back-flow of gases while enabling fluid and solid substances to pass therethrough along a desired flow direction. The valve assembly includes a main housing member having an apertured outlet wall structure with an internal surface defining a valve member receiving region, a second member coupled to the main housing member and having an apertured wall structure with a valve member retaining surface facing the valve member receiving region, and an isolation valve disk member mounted in the valve member receiving region in sealing relation with the internal surface and the valve member retaining surface, the valve disk member comprising a flexible diaphragm having a plurality of slits extending from a central region thereof. In one embodiment, the main housing member is an outlet housing having an inlet and an outlet port; in another embodiment, the main housing member includes a peripheral flange wall structure joined to the apertured outlet wall structure, the apertured outlet wall structure including an apertured bottom wall portion, a side wall portion and a joining wall portion formed at an angle with respect to the bottom and side wall portions; and the second member comprises a valve plate having a dished peripheral portion mounted in sealing engagement with the joining wall portion.

The valve disk member is preferably substantially circular in shape, with the slits extending radially outwardly thereof. The valve disk member further preferably comprises a pair of disks, each having a plurality of slits, the disks being mutually positioned with solid portions of one of the pair of disks overlying the slits of the other one of the pair of disks so that the slits are not mutually aligned. In one embodiment, the disks are secured together by bonding, particularly at locations near the peripheral edges thereof. In another embodiment, the disks are secured to mounting bosses extending from the main housing member or the second member, the disks being provided with boss receiving apertures for this purpose.

The valve member is mounted in the valve chamber in a preloaded attitude at an angle with respect to the desired flow direction. The preloaded attitude is provided by an angled disk-bearing surface in the main housing and a complementary angled surface in the second member, against which the valve member bears when the main housing member is coupled to the second member.

In a first embodiment, the main housing member and the second member are coupled together by means of an externally threaded wall portion formed on the second member and an internally threaded wall portion formed on the main housing. In another embodiment, the main housing member and the second member are adhesively secured together.

From another aspect, the invention comprises a tank isolation valve member comprising a first disk having a peripheral portion, a central region, and a plurality of through slits extending from the central region toward the peripheral portion; and a second disk having a peripheral portion, a central region, and a plurality of through slits extending from the central region toward the peripheral portion. The first and second disks are mutually arranged with the through slits thereof in non-overlapping relation, and are provided with alignment apertures for receiving alignment bosses. The first and second disks are fabricated from a flexible material, such as an elastomeric substance.

For a fuller understanding of the nature and advantages of the invention, reference should be made to the ensuing detailed description, taken in conjunction with the accompanying drawings.

BRIEF DESCRIPTION OF THE DRAWINGS

FIG. 5 is a front elevational view of the disk assembly;

FIG. 6 is a sectional side view of the second embodiment showing the components in the assembled state;

FIG. 7 is a plan view of the inlet side of the second embodiment;

FIG. 8 is a side view of the second embodiment with sealing gaskets fitted;

FIG. 9 is a plan view of the inlet side of the second embodiment with sealing gaskets fitted.

DETAILED DESCRIPTION OF THE PREFERRED EMBODIMENTS

Figure 1:
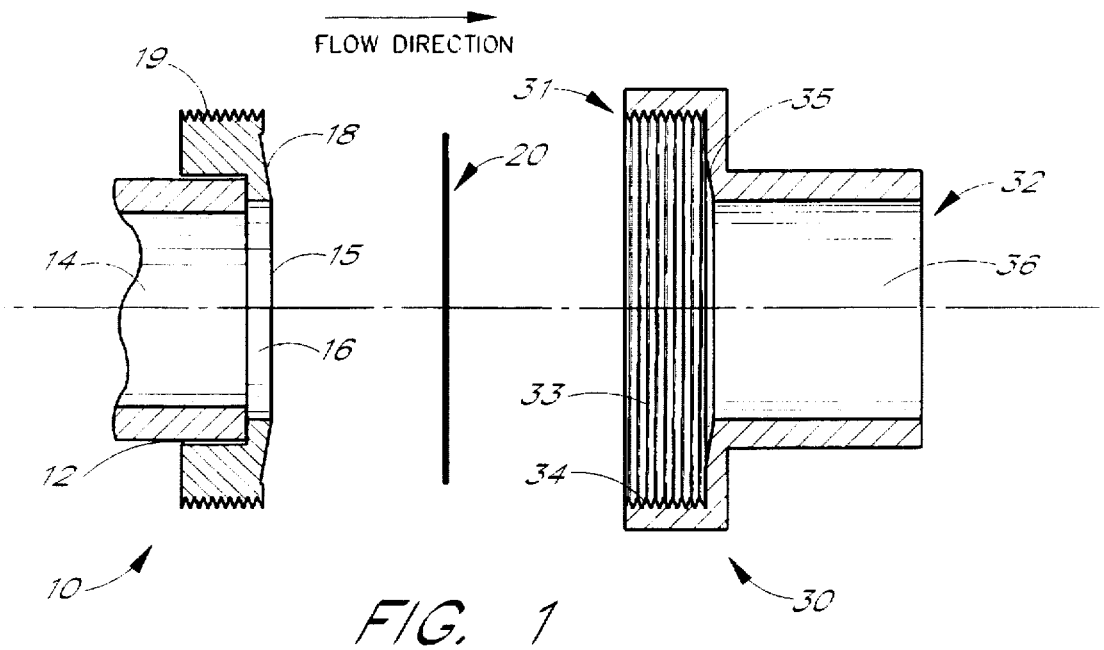
FIG. 1 is an exploded side sectional view showing a first embodiment of the invention.

Turning now to the drawings, FIG. 1 illustrates a first embodiment of the invention in an exploded side sectional view. As seen in this figure, the isolation valve assembly has three components: an adapter housing 10, an isolation valve member 20, and an outlet housing 30. Adapter housing 10 is preferably a unitary member having a recessed inlet 12 of appropriate geometric configuration (e.g. right circular cylindrical) for accommodating a hopper effluent waste port 14. Adapter housing 10 may be installed onto waste port 14 in any suitable manner, for example by using a suitable adhesive (such as an ABS adhesive for plastic components) in order to provide a fluid-tight seal between adapter housing 10 and port 14. Adapter housing 10 has an outlet side generally designated with reference numeral 15 with a throughbore 16. The peripheral surface of the outlet side is provided with an angled wall portion 18 near the periphery thereof for a purpose to be described. Adapter housing 10 is also preferably provided with external threads 19 about the circumference thereof.

Figure 2:
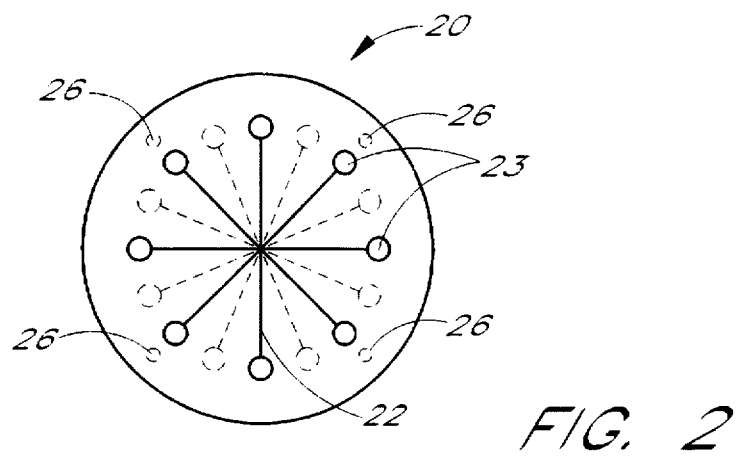
FIG. 2 is a front elevational view of the disk assembly.
Figure 3:
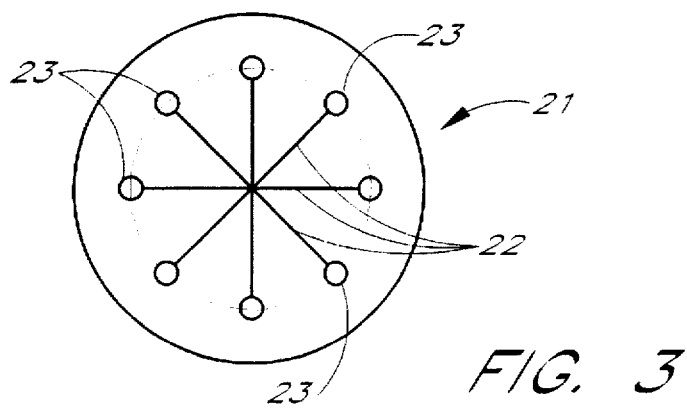
FIG. 3 is a front elevational view of a single disk of the embodiment of FIG. 1.

As best seen in FIGS. 2 and 3, isolation valve member 20 is preferably circular in shape and comprises a pair of unitary valve disks 21 which are identical in configuration. With reference to FIG. 3, each valve disk 21 is provided with a plurality of equispaced radially extending slits 22 extending therethrough with each slit 22 terminating in a circular aperture 23 at the outward radial extremity. Each disk 21 is fabricated from a flexible, durable material, such as an elastomer material (e.g. an elastomer available under the trademark Santoprene from Advanced Elastomer Systems of Akron, Ohio, and having a shore hardness of 55 A and a thickness of 0.016 inch). Disks 21 are bonded together near the periphery thereof by any suitable adhesive, such as cyanoacrylate adhesive. The adhesive is preferably applied as four small droplets in the locations illustrated in FIG. 2 and designated with reference numeral 26.

Outlet housing 30 has an inlet side generally designated with reference numeral 31 and an outlet side generally designated with reference numeral 32. Extending internally of inlet side 31 is a recess forming a valve chamber 33 for accommodating valve member 20. Recess 33 is preferably provided with internal threads 34 which mate with external threads 19 formed on the outer circumference of adapter housing 10. A peripheral internal wall portion 35 is angled at substantially the same angle as angled wall portion 18 of adapter housing 10 but in a complementary manner. Outlet housing 30 is provided with a throughbore 36.

To assemble the tank isolation valve assembly, valve member 20 is inserted into chamber 33, and outlet housing 30 is threaded onto adapter housing 10. As the valve member encounters the outlet side 15 of adapter housing 10, the peripheral portion of valve member 20 is pressed against angled bearing surface 18 by wall portion 35, which preloads the valve member 20 at a slight angle with respect to the desired direction of waste flow (shown as left to right in FIG. 1). In this way, the fingers formed between adjacent through slits in valve disks 21 are preconditioned to readily permit flow in the desired flow direction, while at the same time responding quickly to any back pressure in the opposite direction in order to prevent back flow of gases in the reverse direction through adapter housing 10. In the first embodiment of FIGS. 1–3, the pre-load angle is in a range from about 5 to about 7 degrees.

Both adapter housing 10 and outlet housing 30 are preferably fabricated from a moldable plastic material, such as thermoplastic ABS material commonly used in modern day plumbing supplies.

Figure 4:
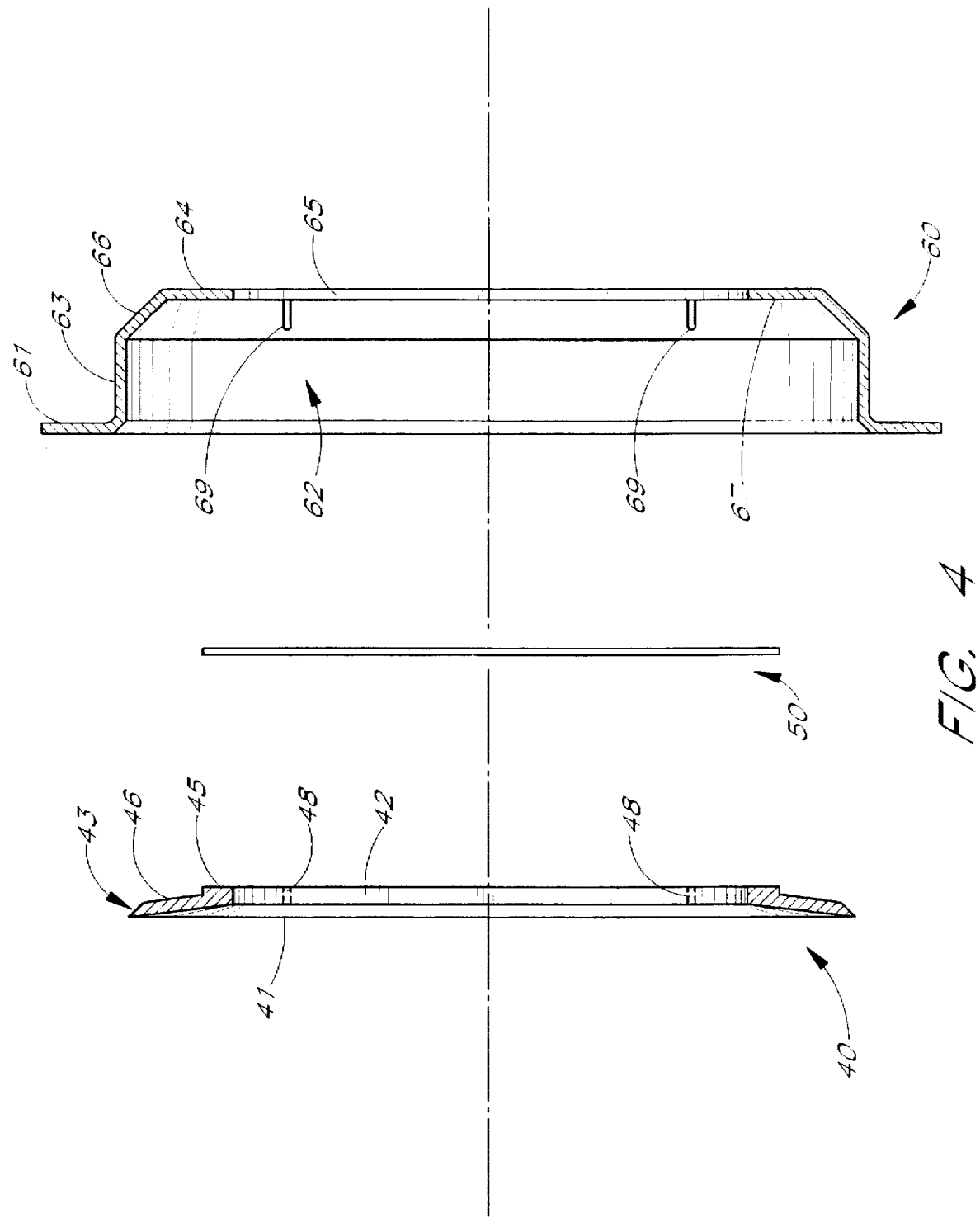
FIG. 4 is an exploded side sectional view showing a second embodiment of the invention.

FIG. 4 illustrates a second embodiment of the invention in an exploded side sectional view. As seen in this figure, the isolation valve assembly has three components: a valve plate 40, an isolation valve member 50, and a valve housing 60. Valve plate 40 is preferably a unitary member having a dished inlet face 41 and a central through aperture 42. The rim portion of valve plate 40 has a peripheral beveled mounting surface 43 and a rear valve member mounting surface 45 formed at an angle to provide preloading for valve member 50. Surfaces 43 and 45 are joined by a notched wall surface 46. As suggested by the broken lines, a plurality of through apertures 48 are formed through valve plate 40 for a purpose to be described.

Valve housing 60 is a generally cup-shaped unitary member having a mounting rim portion 61 and a central body portion defining a cavity 62. The central body portion includes a side wall 63, an outlet wall 64 having a central through aperture 65 and an intermediate wall portion 66 which joins the side wall 63 and the outlet wall 64. The inner surface 67 of outlet wall 64 is formed at an angle with respect to a plane passing through the body of valve housing 60 normal to the longitudinal axis thereof in order to provide preloading of the isolation valve member 30 in combination with the angled surface 45 of valve plate 40 when the valve assembly components are assembled in the manner described below. In the second embodiment, the preload angle is about two degrees.

A plurality of mounting pins or bosses 69 are formed in inner wall surface 67 about through aperture 65. Bosses 69 function to provide an easy reference for mounting the valve disk assembly 50 during assembly as well as a positive permanent mounting reference to prevent angular or translational displacement of the valve disk assembly 50 after assembly.

The valve disk assembly 50 is illustrated in FIG. 5 and is similar in construction to valve disk assembly 20, with the exception that each disk 51 is provided with a plurality (four in the preferred embodiment) of mounting reference apertures 52 near the outer periphery at radial and angular locations matching the locations of mounting bosses 69 in valve housing 60.

To assemble, valve disk assembly 50 is inserted into cavity 62 in such a manner that bosses 69 are received in mounting apertures 52. Next, an appropriate adhesive (such as a cyanoacrylate adhesive) is applied to bosses 69 and to angled mounting surface 43 of valve plate 40. Next, valve plate 40 is inserted into recess 62, apertures 48 are located onto bosses 69, and plate 40 is advanced toward outlet 64 until mounting surface 43 mates with inner mounting surface 66 of valve housing 60. The final assembly is illustrated in FIG. 6. As seen in this figure, valve disk assembly 50 is captured between angled inner surface 67 of valve housing 60 and mounting surface 45 of valve plate 40, with bosses 69 extending through apertures 52 in valve disk assembly 50 and apertures 48 in valve plate 40. Valve plate 40 is retained within valve housing 60 by virtue of the adhesive (not illustrated) between angled mounting surface 43 of valve plate 40 and the confronting portions of inner mounting surface 66. The relative position of bosses 69 and valve disk assembly 50 is illustrated in FIG. 7.

The embodiment of FIGS. 4–7 is especially suitable for use with a pair of annular gaskets in a holding tank environment. As shown in FIGS. 8 and 9, a pair of gaskets 90A, 90B are arranged about the valve assembly in a concentric fashion. A first gasket 90A is received over valve housing 60 on the outlet side of rim 61, and the second gasket 90B is concentrically arranged on the inlet side of rim 61. Gaskets 90A, 90B are preferably adhesive backed foam rubber gaskets, and are arranged with their adhesive bearing surfaces in facing relationship so that the isolation tank valve assembly is loosely captured radially outwardly of rim 61 by the gasket pair. As best shown in FIG. 9 for gasket 90B, the diameter of the central aperture defined by wall surface 92 of gasket 90B is slightly larger than the outer diameter of side wall portion 63 of valve housing 60 in order to provide for ease of assembly.

Figure 10:
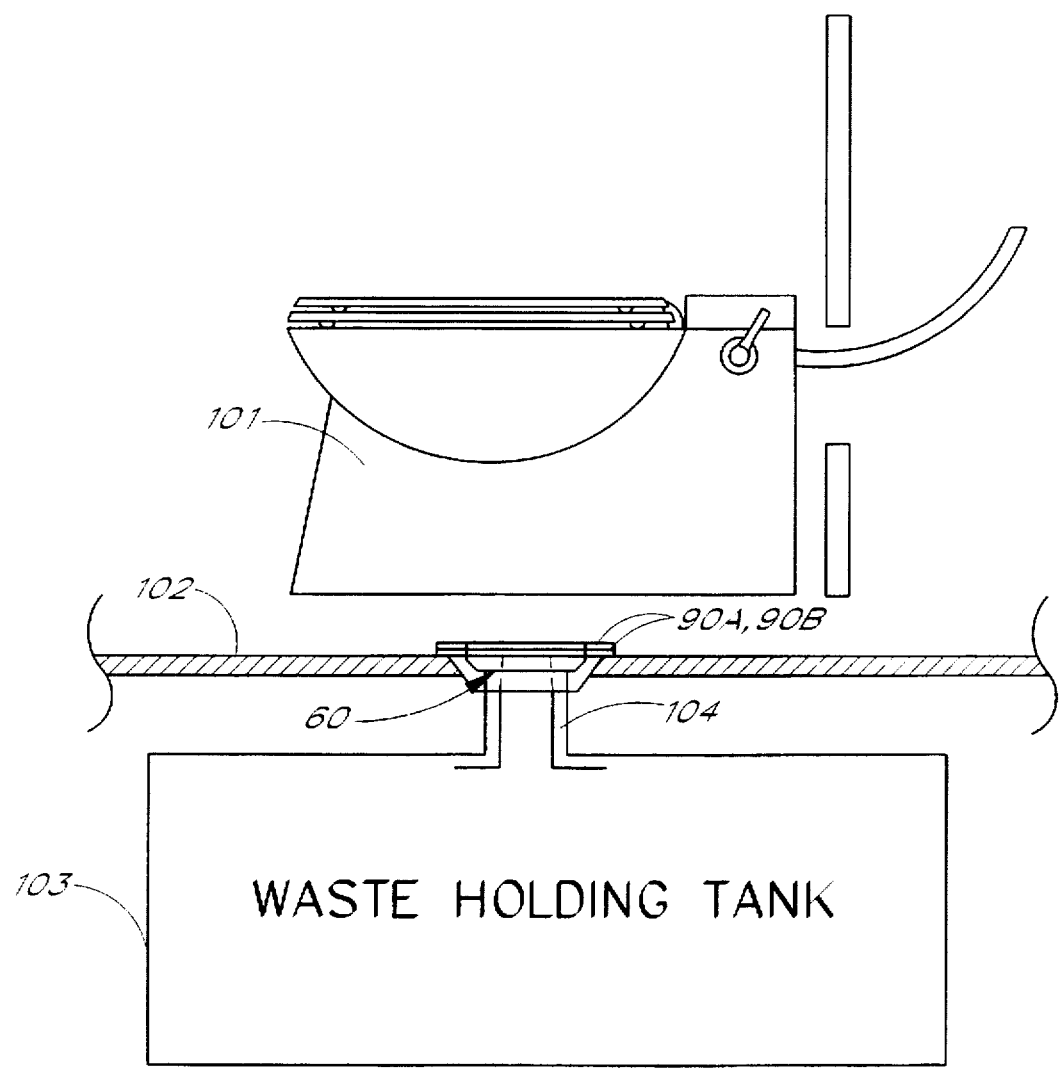
FIG. 10 is a schematic side view showing the second embodiment mounted between a toilet and a waste holding tank.

FIG. 10 illustrates the application of the second embodiment to a toilet installation using a waste holding tank. Installations of this type are typically found in recreational vehicles. As seen in this figure, a toilet 101 is mounted in place over a floor 102. A waste holding tank 103 is mounted below floor 102, the tank 103 having an inlet neck 104. The isolation tank valve is mounted in an aperture in floor 102 and the inlet of neck 104 is received within apertures 42, 65 of the isolation tank valve assembly. Preferably, a fluid seal is formed around the joint between the outer surface of neck 104 and wall surface 64 of valve housing 60. Mounting gaskets 90A, 90B provide a seal between the isolation tank valve assembly, floor 102 and ambient above floor 102. Toilet 101 is typically provided with a waste outlet flange which mates in sealing relation with upper sealing gasket 90B. This type of toilet is colloquially known as a drop-through hopper style toilet, and the floor seal is provided by the foamed gasket rings 90A, 90B which are sandwiched between the toilet and the floor 102. Thus, gasket rings 90A, 90B typically replace the use of a wax ring normally found on a standard water closet flange in floors in recreational vehicles, buses and motor homes.

As can be appreciated from FIG. 9, the invention not only provides an odor barrier but also a visual barrier blocking any view of the contents of the waste holding tank 103.

As will now be apparent, the invention is both capable of providing an effective vapor barrier to the back flow of gases in an effluent discharge path, while at the same time providing ease of installation and serviceability in a wide variety of applications. In addition, the invention provides a tank isolation valve assembly which is of ruggedized design and which uses only a minimum number of components. In addition, the invention provides an esthetically effective visual barrier to the contents of any underlying waste container. Perhaps most importantly, tank isolation valve assemblies fabricated according to the teachings of the invention do not plug or restrict the ability of the associated effluent discharge device (e.g. a toilet) from passing a wide variety of solid and liquid substances, which can easily pass through the flexible fingers of valve members 20 and 50.

While the above provides a full and complete disclosure of the preferred embodiments of the invention, various modifications, alternate constructions and equivalents may be employed, as desired. For example, while the invention has been described with reference to right circular cylindrical geometry, other geometrical configurations can be employed, as desired. In addition, other specific materials than those identified for use in constructing the preferred embodiments will also occur to those skilled in the art. Also, the mounting boss arrangement described with reference to the embodiment of FIGS. 4–10 may be used in the embodiment of FIGS. 1–3. Further, the locations of bosses 69 and apertures 48 may be reversed, so that bosses 69 are formed on the outlet side of adapter housing 10 or valve plate 40 to provide a complementary valve disk mounting arrangement to that expressly shown, if desired. Therefore, the above description and illustrations should not be construed as limiting the scope of the invention, which is defined by the appended claims.

What is claimed is:

1. A tank isolation valve assembly for use in an effluent discharge path to provide a vapor barrier to prevent back flow of gases while enabling fluid and solid substances to pass therethrough in a desired flow direction, said tank isolation valve assembly comprising:

a main housing member having a peripheral flange joined with an apertured outlet wall, said outlet wall defining a valve member receiving region including an apertured bottom wall portion, a side wall portion and a wall portion formed at an angle with respect to and joining said bottom and side wall portions;

a first apertured mounting gasket received about the side wall portion of said main housing member adjacent said peripheral flange, and a second apertured mounting gasket positioned on the opposite side of said peripheral flange from said first mounting gasket, each said gasket having an outer diameter greater than the outer diameter of said peripheral flange;

a second member comprising a valve plate having a convex peripheral portion mounted in sealing engagement with said wall portion, and having an apertured wall structure with a valve member retaining surface facing said valve member receiving region; and an isolation valve member comprising a flexible diaphragm mounted in sealing relationship between said valve member receiving region and said valve member retaining surface, said valve member being provided with a first plurality of boss receiving apertures, said valve plate being provided with a second plurality of boss receiving apertures, and said outlet wall including plurality of valve member mounting bosses extending therefrom and received within said first and second plurality of boss receiving apertures, said flexible diaphragm comprising a pair of disks fabricated from an elastomeric material, each disk having a plurality of slits extending from a central region thereof and wherein said disks are mutually positioned with solid portions of one of said pair of disks overlying the slits of the other one of said pair of disks, said slits being of a length to permit the passage of both fluid and solid effluent therethrough, with at least some of said slits terminating in enlarged openings.

2. The invention of claim 1 wherein said valve member is mounted in said valve member receiving region in a preloaded attitude at an angle less than 90° with respect to the desired flow direction to readily permit effluent flow therethrough in the desired flow direction while providing quick response to any back pressure in an opposite direction in order to prevent back flow of fluids therethrough.

3. The invention of claim 1 wherein said main housing member vomprises an outlet housing having an inlet and an outlet port, and wherein said second member comprises an adapter housing having an inlet for connection to an effluent discharge port.

4. The invention of claim 1 wherein said first and second disks are circular.

5. The invention of claim 1 wherein said first and second disks are provided with alignment apertures.

* * * * *